W. S. MOYER, Dec'd.
S. S. MOYER, Administrator.
COAL-SIFTER.
No. 185,564.  Patented Dec. 19, 1876.
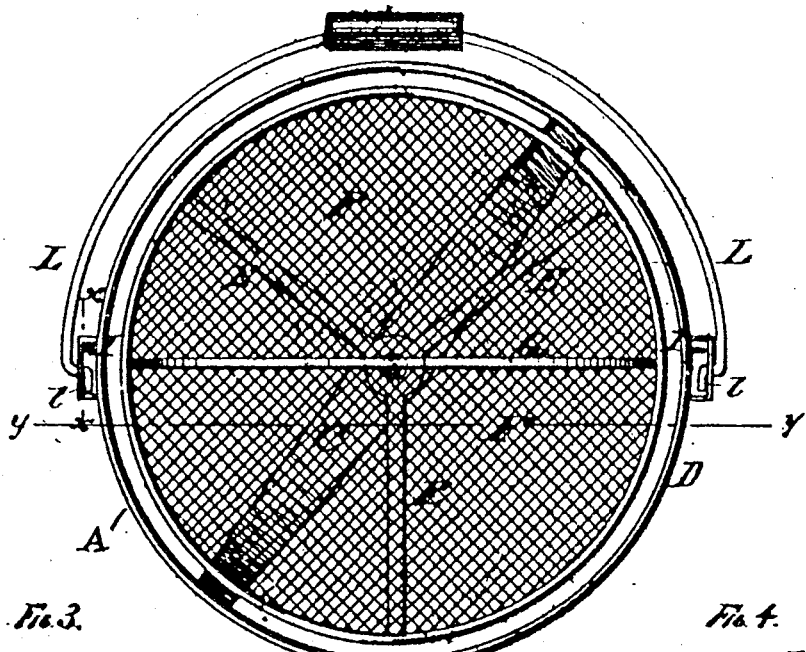
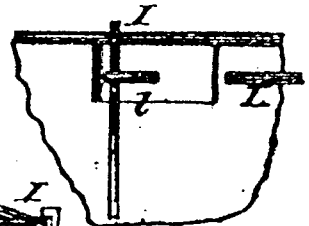
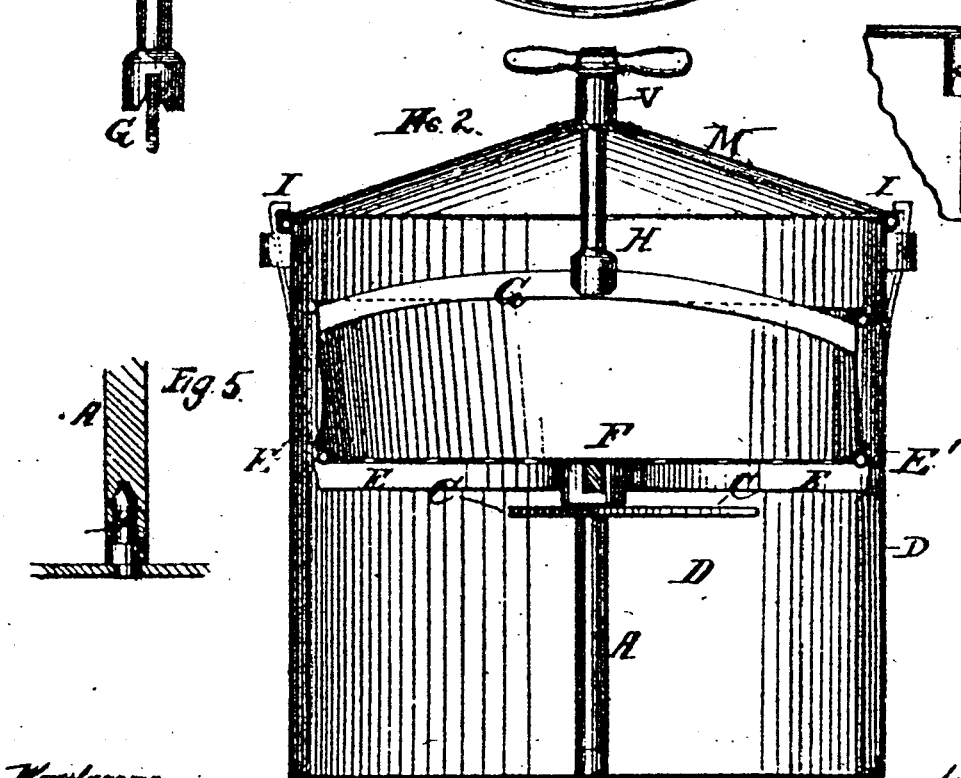

185,564. COAL-SIFTERS. S. S. Moyer, Allentown, Pa., administrator of Wm. S. Moyer, deceased. [Filed Feb. 4, 1876.]

*To all whom it may concern:*

Be it known that WM. S. MOYER, late of Allentown, in the county of Lehigh and State of Pennsylvania, did invent certain new and useful Improvements in Coal-Sifters; and I do hereby declare that the following is a full, clear, and exact description thereof, which will enable others skilled in the art to which it appertains to make and use the same, reference being had to the accompanying drawings, and to the letters of reference marked thereon, which form a part of this specification.

In the accompanying drawings, Figure 1 is a top view of this coal-sifter. Fig. 2 is a vertical section thereof. Figs. 3, 4, and 5 are detached views.

The vessel D is provided with a removable cover, M, having a central socket, V, for the stem or handle H, the lower end of which has a notch to stride the bar or bail G, Fig. 3, for the purpose of turning the sieve, which will soon be described. The cover is fastened by means of hooks I, in connection with the bail L, the ends of which are bent, so as to lock or hold the hooks I upon the cover, as shown at $l$, Fig. 4; but by raising the bail L and turning the same down horizontally in the opposite direction the hooks I are released, and the cover may be removed. Thus, when the sifter is in operation these parts all coact, and are necessary to the construction and operation. The sieve F is supported on radial arms E, which crown the vertical shaft A, and the arms have hooks E', which prevent the sieve from working against the side of the vessel D, thus avoiding friction between the sieve and vessel.

The shaft A has a socket in the foot, which rests on the pintle B, Fig. 5, and is thus held securely in place, and not liable to fill with coal-dust, and the upper end of the shaft is held in a bearing in the cross-bar C, firmly fastened or held by the vessel A.

Having described this invention, I claim—

1. The combination of the rotary sieve F, operated by power applied to a bail, G, and being throughout its inside free from other operating or supporting devices, and provided beneath with radial arms E, having hooks E' projecting outward from and beyond the sieve, and a shaft, A, with a suitable vessel having a pintle on its bottom, and a shaft-holding bar, C, beneath the sieve, as and for the purpose set forth.

2. The hooks I, in combination with the bail L, having the ends $l$ bent, as described, for the purpose of alternately fastening and releasing the cover M at pleasure, substantially as specified.

In testimony that the late WM. S. MOYER claimed the foregoing as his own, I, as administrator, affix my signature in presence of two witnesses.

SOLOMON S. MOYER,
*Administrator of the late Wm. S. Moyer,*

Witnesses:
A. K. WITTMAN,
JONAS E. LAZARUS